United States Patent
Hall et al.

(10) Patent No.: US 7,487,316 B1
(45) Date of Patent: Feb. 3, 2009

(54) ARCHIVE AND RESTORE SYSTEM AND METHODOLOGY FOR ON-LINE EDITS UTILIZING NON-VOLATILE BUFFERING

(75) Inventors: Kenwood Henry Hall, Hudson, OH (US); Ronald E. Schultz, Solon, OH (US); Charles M. Rischar, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1215 days.

(21) Appl. No.: 09/954,367

(22) Filed: Sep. 17, 2001

(51) Int. Cl.
*G06F 12/00* (2006.01)
*G06F 13/00* (2006.01)
*G06F 1/26* (2006.01)
*G06F 1/32* (2006.01)
*G06F 11/00* (2006.01)
*G06F 3/00* (2006.01)
*G05B 19/42* (2006.01)

(52) U.S. Cl. .................. 711/168; 711/103; 711/104; 711/111; 711/154; 713/320; 714/22; 710/19; 710/20; 710/21; 700/87

(58) Field of Classification Search .......... 711/4, 711/103, 104, 111, 161, 173, 209, 168, 154; 709/217; 713/320; 714/21, 24, 22; 710/19, 710/20, 21; 700/87
See application file for complete search history.

(56) References Cited

U.S. PATENT DOCUMENTS

| | | | | |
|---|---|---|---|---|
| 4,802,117 A * | 1/1989 | Chrosny et al. | ................ | 714/5 |
| 4,858,101 A * | 8/1989 | Stewart et al. | ................. | 700/2 |
| 5,151,907 A * | 9/1992 | Robbins | ....................... | 714/22 |
| 5,416,908 A * | 5/1995 | DiCarlo et al. | ................ | 710/34 |
| 5,799,200 A * | 8/1998 | Brant et al. | .................. | 713/340 |
| 5,912,848 A * | 6/1999 | Bothwell | ..................... | 365/195 |
| 5,923,829 A * | 7/1999 | Ishii et al. | ....................... | 714/7 |
| 6,016,263 A * | 1/2000 | Chen | ........................... | 365/51 |
| 6,038,669 A | 3/2000 | Yang | .......................... | 713/300 |
| 6,070,226 A * | 5/2000 | Freeman et al. | ............. | 711/117 |
| 6,092,149 A * | 7/2000 | Hicken et al. | ............... | 711/113 |
| 6,119,211 A * | 9/2000 | Kaneko et al. | .............. | 711/166 |
| 6,249,841 B1 * | 6/2001 | Sikes et al. | .................. | 711/107 |
| 6,301,635 B2 * | 10/2001 | Bothwell et al. | ............ | 711/103 |

* cited by examiner

*Primary Examiner*—Gary J Portka
*Assistant Examiner*—Mardochee Chery
(74) *Attorney, Agent, or Firm*—Amin Turocy & Calvin LLP; R. Scott Speroff

(57) ABSTRACT

The present invention relates to a system and methodology to mitigate memory current requirements in an industrial controller and to facilitate efficient on-line editing, storage and retrieval of user programs and data. A segmented memory architecture is provided, wherein a first memory segment is loaded with programmed instructions and other data that is relatively static in nature. A second memory segment is provided for storage of dynamic information such as controller data table variables that change frequently and/or rapidly during program execution of the controller. An execution memory is concurrently loaded with the user program to facilitate high performance program execution and to enable on-line edits of the user program during operation of the controller.

26 Claims, 9 Drawing Sheets

ARCHIVE AND RESTORE SYSTEM AND METHODOLOGY FOR ON-LINE EDITS UTILIZING NON-VOLATILE BUFFERING

TECHNICAL FIELD

The present invention relates generally to industrial controllers, and more particularly to a system and method to mitigate memory auxiliary power requirements via a non-volatile buffering mechanism and functional segmentation of an industrial controller operating environment.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet or Control Net and also communicate to higher level computing systems. Industrial controllers utilize the aforementioned technologies along with other technology to control multiple applications ranging from complex and dangerous to more traditional and repetitious applications. As an example, steel and automobile production often require control and integration with complex welding and/or robotic systems whereas, a transfer or automated assembly line can produce hundreds of thousands of similar items daily such as with beverages or packaged products.

At the core of the industrial control system, is a logic processor such as a Programmable Logic Controller (PLC). PLC's are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are data table variables that provide dynamics to PLC operations and programs. These variables include bits, bytes, words, integers, floating point numbers, timers and counters to name but a few examples.

Non-volatile memory (e.g., data retained by memory during power loss) typically provides an important aspect in conventional PLC operations, wherein power-up and power-down memory retention functionality enables PLC's to return to a previous state of operation. Upon power-up of the PLC, for example, user programs and data tables generally must be restored to conditions or states that were present just prior to power-down. Since speed is also an important aspect for PLC operations, volatile high-speed memory (e.g., SRAM/SDRAM) is often employed. In order to retain state information during power-up and down operations, batteries are commonly utilized in conjunction with high-speed memory to retain memory voltages and associated contents during power-down conditions.

The above architectural configuration, wherein memories are backed-up with power sources, such as batteries, enables changes to be made to PLC application programs while the PLC remains in an operational state, yet, preserves changes even if power is lost immediately after the changes are made. Flexibility to make such changes to an operating application is of great value to control applications that run continuously such as with paper mills and chemical processes, for example. Unfortunately, as program requirements and resultant memory sizes increase, battery current supplied to the memory increases significantly. Thus, battery life is a major issue especially in smaller and medium sized controllers, wherein the controllers are likely distributed throughout a large factory or geographical area making battery replacement difficult and costly. In view of the above problems, there is a need for a system and methodology to mitigate battery current or auxiliary power requirements associated with PLC memories.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate high-speed operations of a Programmable Logic Controller (PLC), provide memory retention capabilities during power loss, mitigate auxiliary power requirements associated with memory retention and enable PLC operational program changes and/or on-line editing. This is achieved by providing a segmented memory and processing architecture, wherein a user application program and other aspects of a control application that change infrequently are stored in a non-volatile memory that does not require auxiliary power such as a battery to retain information. Dynamic and rapidly changing information such as PLC data table variables are segmented and maintained in an auxiliary-powered memory, whereas a volatile high-speed memory is provided for PLC program execution. In this manner, the segmented architecture mitigates battery current requirements by retaining portions of the PLC program in the non-volatile memory and thus reducing the amount of data that is retained in the auxiliary-powered memory. Dynamic and high-speed operation is maintained by employing the volatile memory for run-time/on-line program edit operations and by employing the auxiliary-powered memory for run-time/power cycling operations.

In accordance with one aspect of the present invention, a user application program and other relatively static portions of the user application are loaded into a high-speed volatile memory (e.g., SDRAM) for speed of execution and concurrently loaded into a non-volatile memory (e.g., FLASH) that does not require auxiliary power to provide program persistence during power cycling operations. At power up, the user program that is stored in the non-volatile memory is loaded into the high-speed volatile memory to take advantage of higher speed performance provided by the volatile memory and to enable on-line editing of the user program. After loading, the non-volatile and volatile memories generally contain the original portions of the user program, respectively. As edits are made to the user program in the volatile memory, an edit log is provided that records the changes in the non-volatile memory.

During power up operations, the original program can be loaded into the volatile memory from the non-volatile memory and the edit log utilized to update the volatile memory with the most recent program changes that existed prior to power down. Background operations can be provided in accordance with the present invention that clear the edit log and update the current state of the user program in the nonvolatile memory over time. This can be achieved by copying current contents of the volatile memory reflecting the most recent state of the user program to the non-volatile memory during the background operations. Thus, the non-volatile memory is kept substantially current with the most recent user program as defined by changes from previous on-line program edits.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to mitigate memory current requirements associated with memory backup configurations in an industrial controller and to facilitate efficient on-line editing, storage and retrieval of user programs and data. A segmented memory architecture is provided, wherein a first memory segment is loaded with programmed instructions and other data that is relatively static in nature. The first memory segment does not employ an auxiliary power source such as a battery to provide persistence during times of power loss to the controller. A second memory segment is provided for storage of dynamic information such as controller data table variables that change frequently and/or rapidly during program execution of the controller. The second memory segment maintains data persistence via an auxiliary power source such as a battery during power loss to the controller. An execution memory is concurrently loaded with the user program to facilitate high performance program execution and to enable on-line edits of the user program during operation of the controller. By segmenting portions of the controller functionality into separate memory portions, less auxiliary power is required to maintain the current state of the controller program that often changes over time as users edit and/or change the user program from that which was originally loaded. As a consequence, battery lifetime is improved since less memory is backed-up during power loss conditions.

Figure 1:
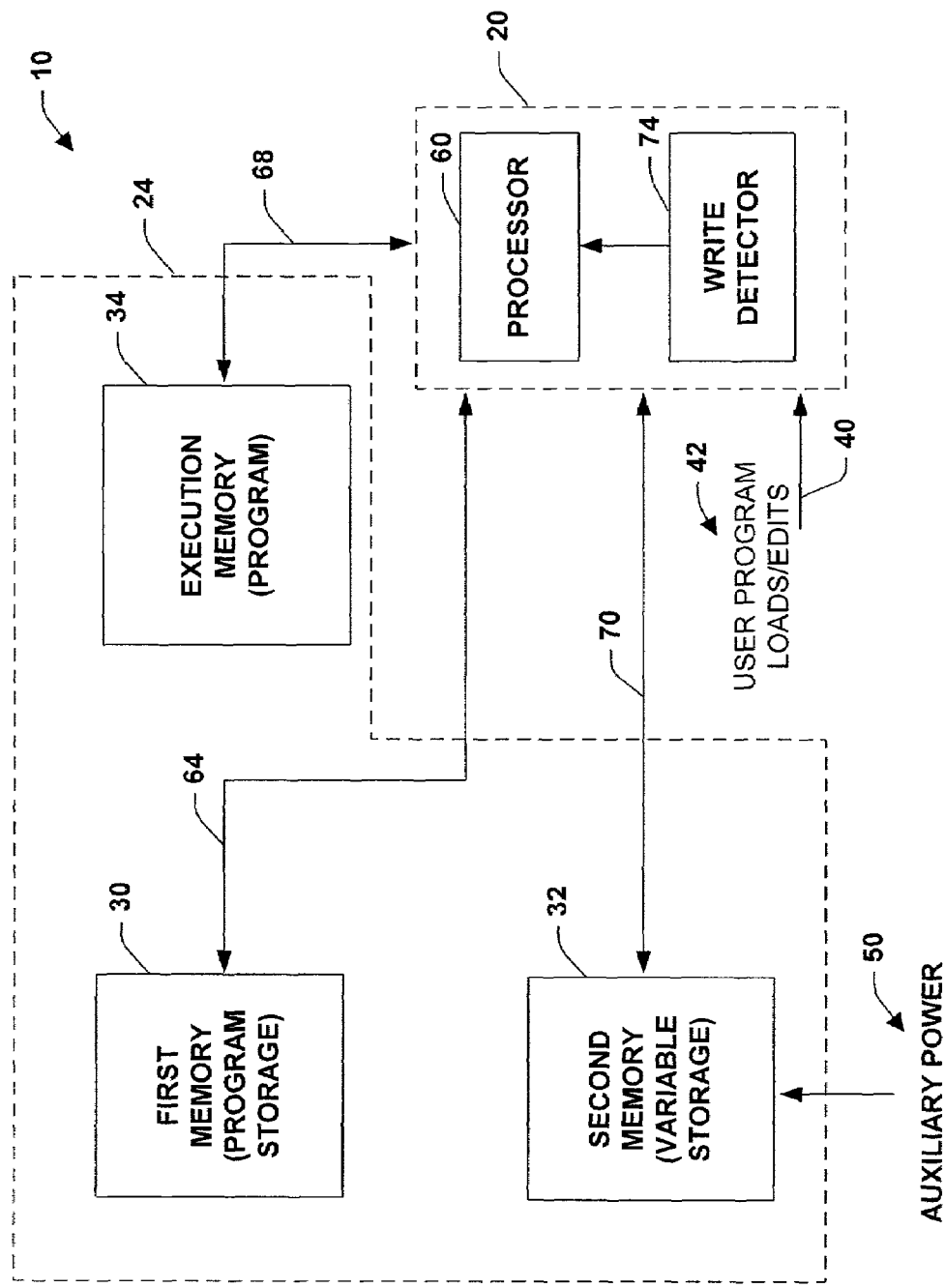
FIG. 1 is a schematic block diagram illustrating an industrial controller and memory architecture in accordance with an aspect of the present invention.

Referring initially to FIG. 1, an industrial controller 10 and associated memory architecture is illustrated in accordance with an aspect of the present invention. The industrial controller 10 which can be a Programmable Logic Controller (PLC) includes a processing unit 20 that can read, write, and execute from a segmented memory architecture 24 that includes a first memory 30, a second memory 32 and an execution memory 34. The first memory 30 generally stores a user program (not shown) and/or other relatively static data (e.g., processing unit configuration information) that typically changes and/or is updated infrequently over time. This type of memory can retain data without auxiliary power in the event of power loss to the controller 10. A programming input 40 (e.g., serial, parallel, network connection) at the processing unit 20 can receive user programs and/or edits 42 that are then loaded into the first memory 30 by the processing unit 20.

Concurrently to loading the first memory 30, the execution memory 34 is also loaded with the user's program. The execution memory 34 is a volatile memory that does not retain memory contents if power is lost to the controller 10. However, this type of memory is generally employed to facilitate higher speed program execution of the processing unit 20 since volatile memories generally provide faster read/write access and update times. The second memory 32, which can also be a higher speed volatile memory, is loaded with dynamic and/or variable information (not shown) that is likely to change frequently or rapidly during execution of the processing unit 20. These variables can include a plurality of data types such as integers, floating point numbers, binary and analog data types (e.g., digital data derived from analog signals), for example. An auxiliary power source 50 is provided to the second memory 32 to preserve the state of the variables in the event of power loss to the controller 10. Generally, after power loss to the controller 10, it is desirable to return the controller to the state of operation just prior to power loss, thus, the first memory 30 returns the state of the user's program or other information and the second memory 32 returns the state of variables that are affected or operated upon by the user's program.

By segmenting the data retention capabilities of the controller 10 into the first and second memories 30 and 32, auxiliary power 50 supplied by the controller 10 can be reduced over conventional systems. For example, a conventional architecture can include a single memory or memory array to provide data persistence or retention to the user's program and the variables during power loss. It is noted that a conventional array for storing the combined program and variables can be supplied with auxiliary power to retain data during power loss. Thus, more data would consequently be stored in a conventional memory architecture utilizing auxiliary power. As can be appreciated, as data storage requirements increase, auxiliary power requirements also increase. Therefore, if a battery or other power device were supplying the auxiliary power, the lifetime of the device would decrease more rapidly in a conventional architecture.

According to another aspect of the present invention, online editing, storage, archival and retrieval of the user's program, configuration and/or variables is also provided. This is achieved via one or more routines that can be executed by the processing unit 20 and are described in more detail below. The processing unit 20 includes a processor 60 (e.g., microprocessor, micro-controller, Application Specific Integrated Circuit (ASIC), Digital Signal Processor (DSP), processor array) adapted to execute the user's program and interface to the memories 30-34 during program edit/change operations and/or during power cycling conditions. Upon power-up conditions of the controller 10, and if a program has been previously loaded as described above, the processor 60 reads the first memory 30 via a bus 64 and loads the execution memory via a bus 68. During execution of the program, the processor 60 also interacts with variables in the second memory 32 via bus 70.

It is to be appreciated that although the buses 64, 68 and 70 are depicted as separate buses, these buses can also be provided as a common bus or a subset thereof included as part of the common bus, wherein the processor 20 enables a selected memory via the common bus. As an example that is within the scope of the present invention, the bus 68 and 70 could be included as part of a common or separate bus and the bus 64 could function as a remote bus. The remote bus could include a network connection, for example, wherein the contents or portions thereof the first memory 30 can be stored and retrieved as data packets via a signal to a remote location from the controller 10 such as within a remote hard drive, floppy disk drive, and/or updateable CD ROM, for example.

During operations of the controller 10, users can enter changes to the program via the programming input 40. As attempts are made to edit the user program that resides in the execution memory 34, a write detector 74 detects the attempted edit (e.g., codes describing changes to the user program) and interrupts the processor 60. As will be described in more detail below, the processor 60 updates an edit log (See e.g., FIG. 2) in the first memory 30 with change information relating to the attempted program edit and then writes the edit information to the execution memory 34 to complete the user's desired change to the program. If power is lost to the controller 10 after the edits are updated in the edit log, the information in the edit log is then employed upon power-up of the controller 10 to return the user's program to the most recent state as defined by the original program and updates in the edit log. For example, upon power-up after program edits have been made, the user's program as originally loaded is transferred from the first memory 30 to the execution memory 34. The contents of the edit log are then "played back" by the processor 60 to update the user's program in the execution memory 34 to reflect the most recent changes as programmed by the user before power was lost. As time goes by, the edit log can be cleared and the first memory 30 configured to match the most recent program that resides in the execution memory 34 via the processor 60.

Figure 2:
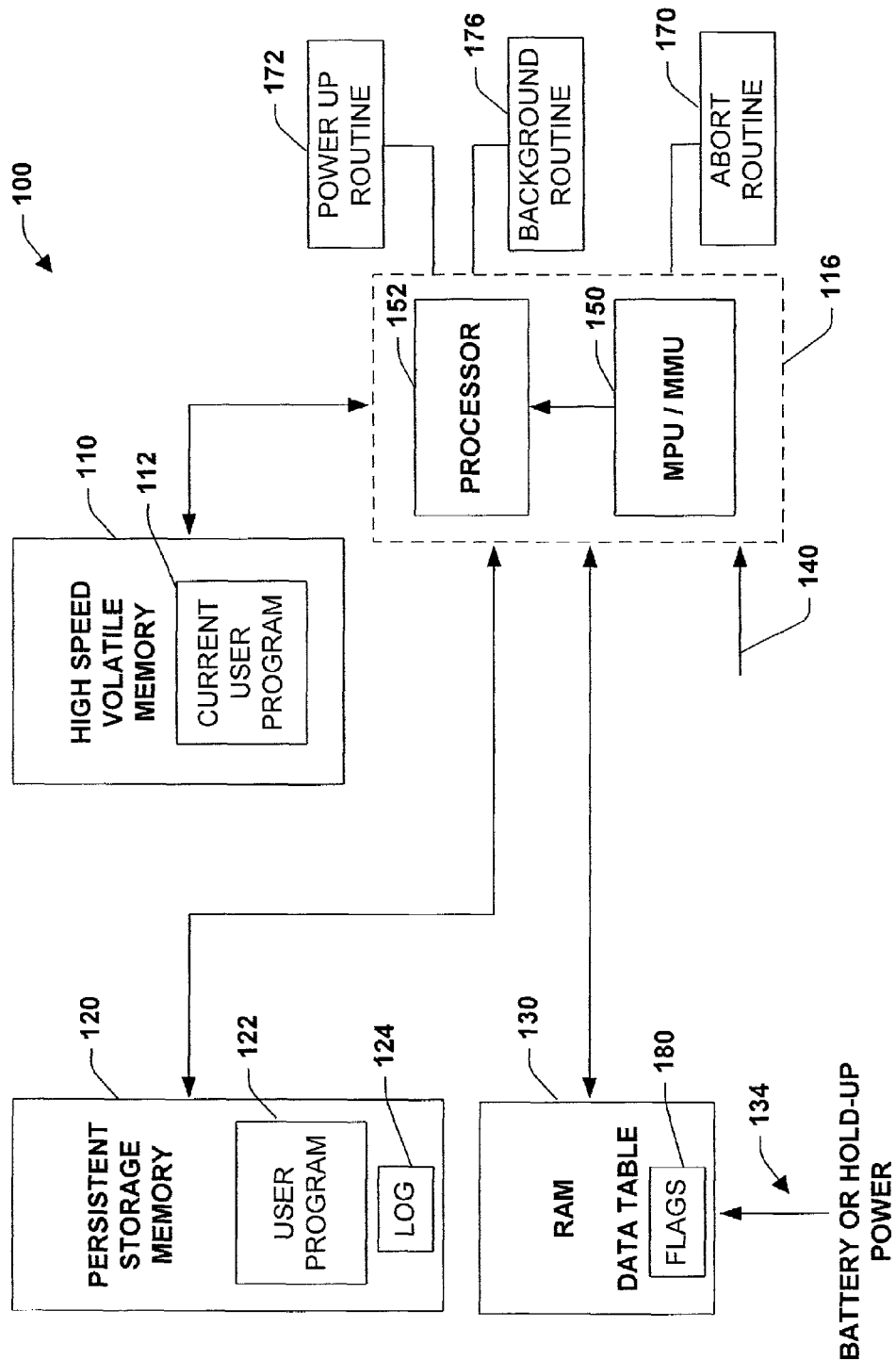
FIG. 2 is a schematic block diagram illustrating an industrial controller with program archival and restoring in accordance with an aspect of the present invention.

Referring now to FIG. 2, an industrial controller 100 with program archival and restoring is illustrated in accordance with an aspect of the present invention. The controller 100 includes a high-speed volatile memory 110 that stores a current user program 112 executed by a processing unit 116. The high-speed volatile memory 110 can be various types of commercially available or industrial grade memory such as Static Random Access Memory (SRAM) or Static Dynamic RAM (SDRAM), for example. The memory 110 does not retain memory contents if power is lost to the controller 100. A persistent storage memory 120 operates in conjunction with the high-speed volatile memory 110 to enable user program archival and storage. The persistent storage memory 120 can be substantially any type of memory device that can maintain memory contents if power is lost to the controller 100. This can include FLASH memory devices along with Electrically Erasable Programmable Read Only Memory (EEPROM) devices as well as other persistent storage devices as can be appreciated.

As illustrated, a user program 122 can be archived in the persistent storage memory 120 along with an edit log 124 that describes changes to the current user program 112. Variable data (e.g., data table variables) that is associated with the current user program 112 is stored in a RAM 130 (e.g., SRAM/SDRAM) and provided with auxiliary power 134 to maintain RAM 130 contents if power is lost to the controller 100. It is noted that the auxiliary power 134 can include substantially any type of power source suitable to maintain memory contents during power outages to the controller 100. These power sources can include one or more batteries (e.g., NiCad, Lithium, Alkaline) or other type device such as a capacitor and/or uninterruptible power supply (UPS). Archival and restoring capabilities of the controller 100 can include receiving an initial program as part of a download operation at a programming input 140 of the processing unit 116. The processing unit 116 can load the high-speed volatile memory 110 and the persistent storage memory 120 with similar versions of the initial program as the current user program 112 and user program 122.

If program edits are made via the programming input 140, the current user program 112 and/or data table in the RAM 130 is updated and the edit log 124 is employed to record changes to the initially loaded program as directed by the program edits. The edit log 124 can be created by employment of a write or edit detector such as a Memory Protection Unit (MPU) and/or Memory Management Unit (MMU) depicted at reference numeral 150 that can be included within or external to a processor 152. This can be achieved by marking the current user program 112 as "read only" as defined by address range registers in the MPU/MMU 150. After marking, attempted writes to the current user program 112 due to on-line edits, downloads, and/or other program change reasons are trapped via an abort routine 170 that can be initiated by the MPU/MMU 150 to the processor 152 such as via an interrupt, for example. The abort routine 170 can then capture the change that was attempted, enter the change into a serial log of changes in the edit log 124, and then write the change to the high-speed volatile memory 110 to update the current user program 112.

Upon power up of the controller 100, a power-up routine 172 is executed by the processor 152 that loads the user program 122 into the current user program 112 portion of the high-speed volatile memory 110. The power-up routine 172 also utilizes the edit log 124 to restore the current user program 112 to the most recent state as defined by program edits that were attempted before power was lost to the controller 100. Since the persistent memory 120 can be partitioned into blocks, if the edit log 124 exceeds a block, a subsequent edit log (not shown) can be started in a different block of memory 120.

To prevent the edit log 124 from increasing without bound, the most recent version of the user program 112 containing all the edits thus far, can be reprogrammed into the persistent storage memory 120 a block at a time (or other method) utilizing another block of memory 120 as a temporary data buffer. This can be achieved during a background routine 176 of the processor 152. Thus, additional blocks of persistent storage memory 120 (e.g., three blocks) can be utilized in addition to that generally required for the user program 122. As will be described in more detail below, a small amount of storage in the RAM 130 may be provided for one or more flags 180 that control the archive and restore operations described above.

It is noted that reprogramming of the persistent storage memory 120 (e.g., causing the user program 122 to be updated or reflect the current user program 112) is achieved by the background routine 176 during background operations of the processor 152. This enables edit/programming operations to be substantially transparent to the user and for program execution to continue substantially without delay. It is possible for some delay if a second edit log becomes full before the contents of the first edit log have been updated in the user program 122 from the contents of the current user program 112. To optimize writing of data to the persistent storage memory 120, the abort routine 170 can optimize what is written to the edit log 124. For example, if the abort routine 170 writes a string of bytes, then the first entry in the edit log 124 can be a write byte operation. When a subsequent byte is written, the edit log can be updated with a write word operation and so forth until further writes facilitate a write block operation. Alternatively, since writing to the persistent storage memory 120 is generally sequential, a block size can be written after address and data have already been recorded and a program edit to a non-sequential address is detected by the MPU/MMU 150.

Figure 3:
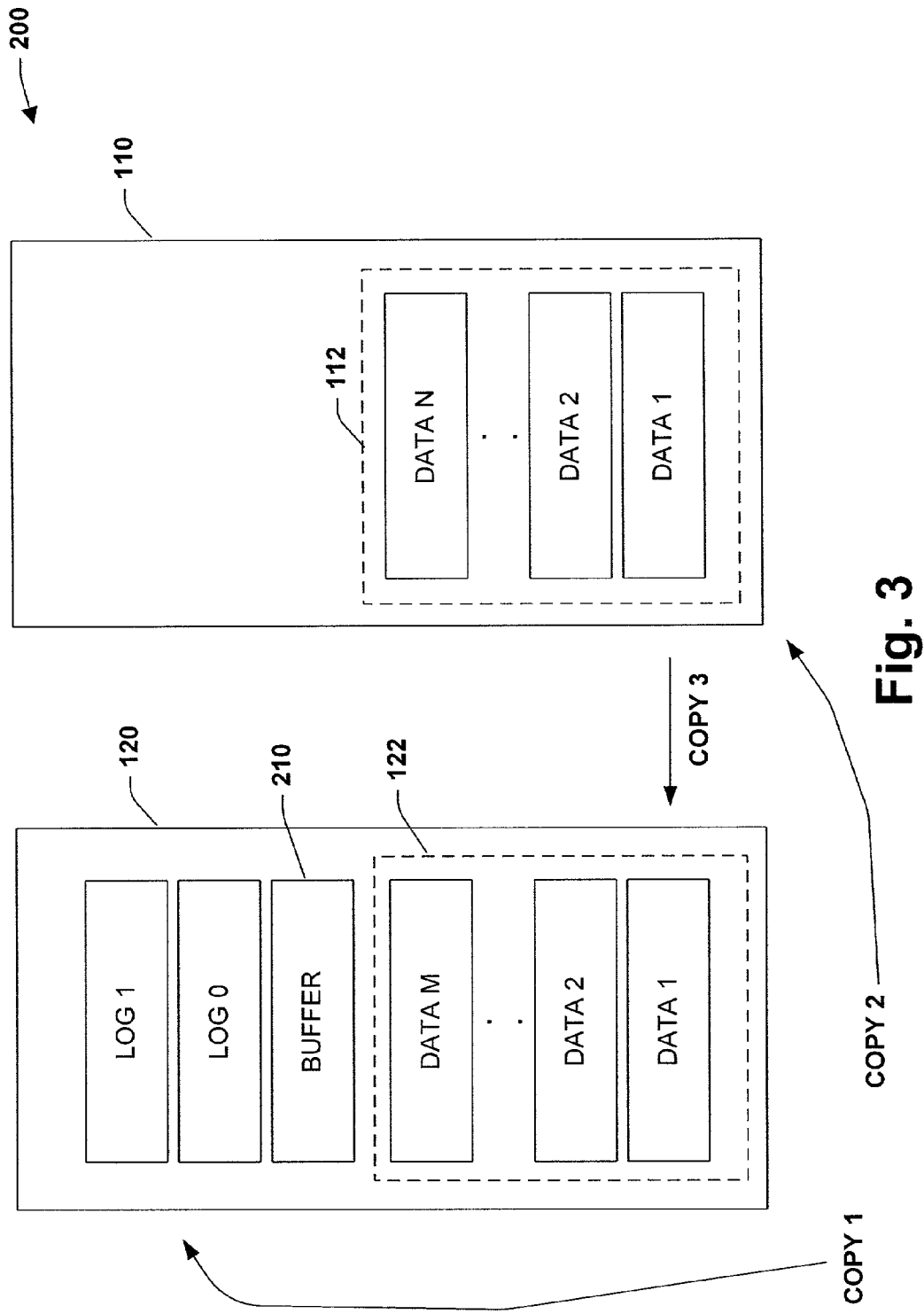
FIG. 3 is a diagram illustrating an exemplary memory structure and edit log in accordance with an aspect of the present invention.

Referring to FIG. 3, an exemplary memory structure 200 and edit log is illustrated in accordance with an aspect of the present invention. The memory structure 200 depicts one possible volatile memory 110 and/or persistent memory 122 organization according to a block data arrangement although it is to be appreciated that other arrangements are possible. It is noted that persistent memories such as FLASH technology are generally arranged according to blocks or segments. The current user program 112 is stored in 1 to N data blocks, N being an integer, whereas the user program 122 is stored in 1 to M data blocks, M also being an integer. When program edits are attempted to the user program 112 as described above, the abort routine 170 first copies the attempted edits to one or more log data blocks depicted as Log 0 and Log 1.

After the Log 0 or Log 1 has been updated with the attempted edit, the contents of the current user program 112 are updated with the program edits during a second copy or update operation. During controller background operations, the contents of the current user program 112 as provided in data blocks 1 through N are copied (Copy 3) to the user program storage space 122 as defined by data blocks 1 through M. In this manner, the persistent storage memory 120 is refreshed to reflect the current state of the user's program without generally requiring the user or controller program to wait for such an update to occur. As described above, if Log 0 and Log 1 have been filled before the updates to the user program 122 have completed, a possible minor delay for the user can occur. As will be described in more detail below, a buffer block 210 can be provided to facilitate updating the user program 122 with the contents of the current user program 112.

Figure 4:
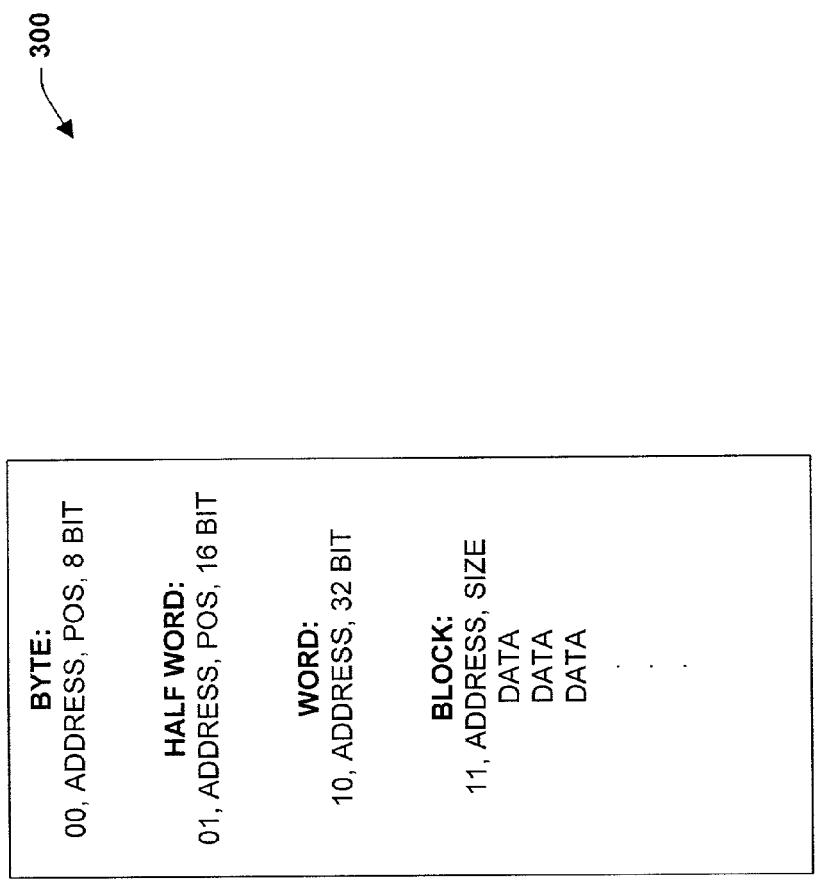
FIG. 4 is a diagram illustrating an exemplary log format in accordance with an aspect of the present invention.

Turning to FIG. 4, an exemplary log format 300 is illustrated in accordance with an aspect of the present invention. Depending on the size of potential program edits (e.g., number of data changes) to the current user program 112, the edit log format includes a plurality of possible write or update options. This can include smaller program edits of a byte or half word that are defined as 8 and 16 bit data respectively, but can include larger program edits of a word or block of data. For potential write sizes to memory, a descriptor field is provided in the format 300 for respective sizes and to direct update operations. For example, a code of 00 (e.g., code can be generated by MPU/MMU) can be utilized to indicate a byte update, having an associated address location, position (e.g., high byte/low byte), and 8 bits of edit data. A code of 01 can be employed to indicate a half word update, having an associated address location, position (e.g., high half word/low half word), and 16 bits of edit data. A code of 10 can indicate a word update, having an associated address location and 32 bits of edit data. A code of 11 can indicate a block update having an associated block begin address, size indication, and a number of data elements according to the size indication. It is to be appreciated that other codes and data organizational structures can be employed.

Figure 5:
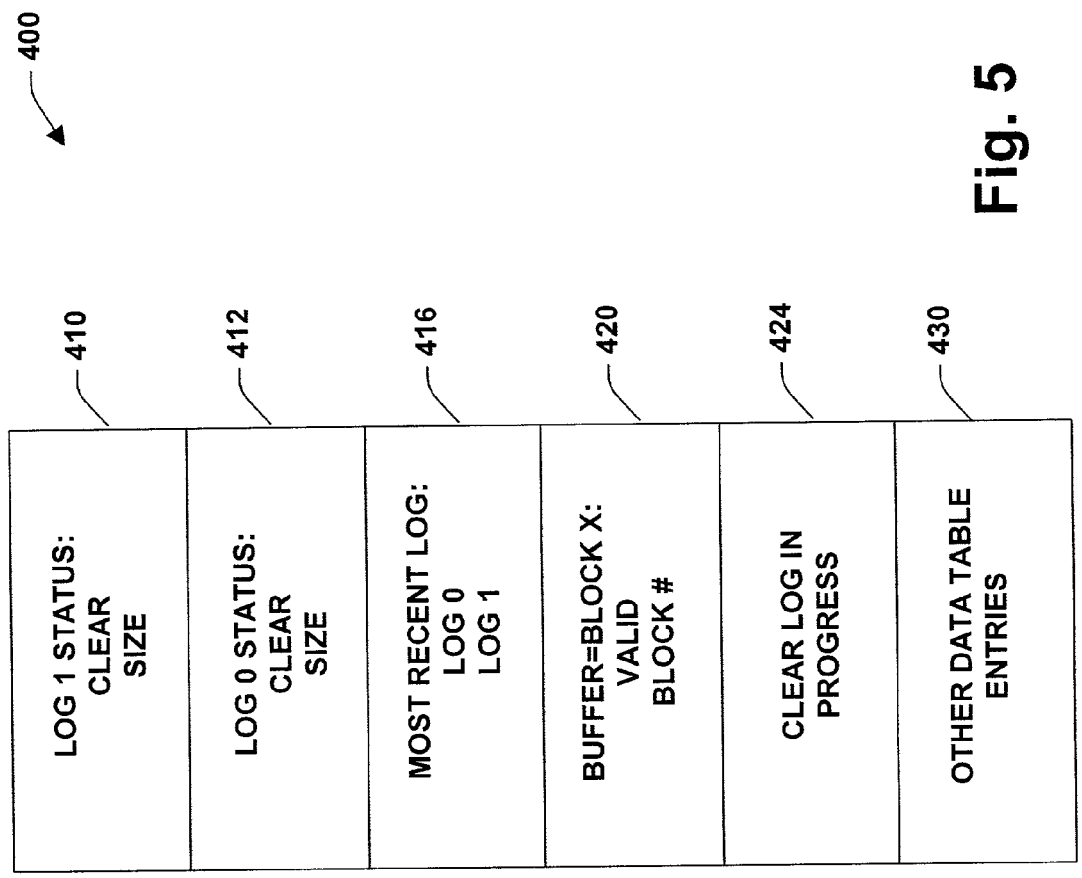
FIG. 5 is a diagram illustrating archive and restore flags in accordance with an aspect of the present invention.

Referring now to FIG. 5, exemplary archive and restore flags/fields 400 are illustrated in accordance with an aspect of the present invention. In conjunction with various routines and/or processes described below, one or more flags/fields 400 can be employed to facilitate various aspects of archiving and restoring user programs in accordance with the present invention. For example, flag locations 410 and 412 can record information relating to the status of Log 0 and Log 1 described above. The status can include a clear status that indicates whether log contents have been completely updated in the current user program 112 and subsequently, the user program 122. This can include a true or false indication (e.g., 1 or 0 state). If a respective Log is clear for example, new edits can be entered into the log. A size field can be provided to indicate the length of the log (e.g., length in bits, bytes, half words, words and so forth). A most recent flag location 416 is provided to indicate which log block is the most recent block to update or copy from. A buffer-block X field 420 indicates whether a block has been completely copied via a valid field and also indicates the current block to be copied via a block # field. A clear log in progress field 424 is provided to indicate an active log is currently being cleared after the current user program has been copied to the user program storage space in the persistent memory. As noted above, the flags/fields 400 can be stored in an auxiliary-powered memory, thus, other data table variables or values are illustrated at 430.

FIGS. 6 through 9 illustrate methodologies to facilitate archival and retrieval in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
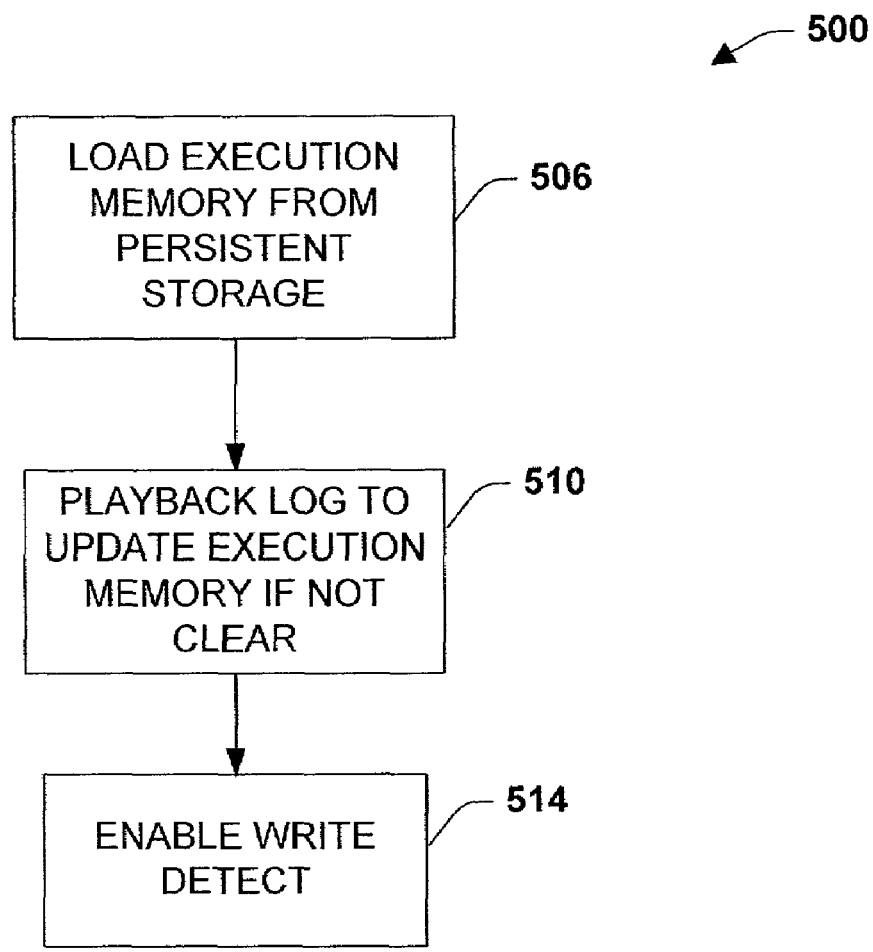
FIG. 6 is a flow diagram illustrating a methodology for a power-up routine in accordance with an aspect of the present invention.

Turning now to FIG. 6, a flow diagram 500 illustrates a power-up routine or process in accordance with an aspect of the present invention. Proceeding to 506, a user program is loaded into an execution memory from a persistent storage memory such as a FLASH memory. At 510 a log is played back to update the user program that was loaded at 506 to the most recent state before power was lost. At 514, write detection is enabled such that if any edits are attempted to the user program residing in the execution memory, a detection circuit will invoke an abort routine that is described in more detail in relation to FIG. 8.

Figure 7:
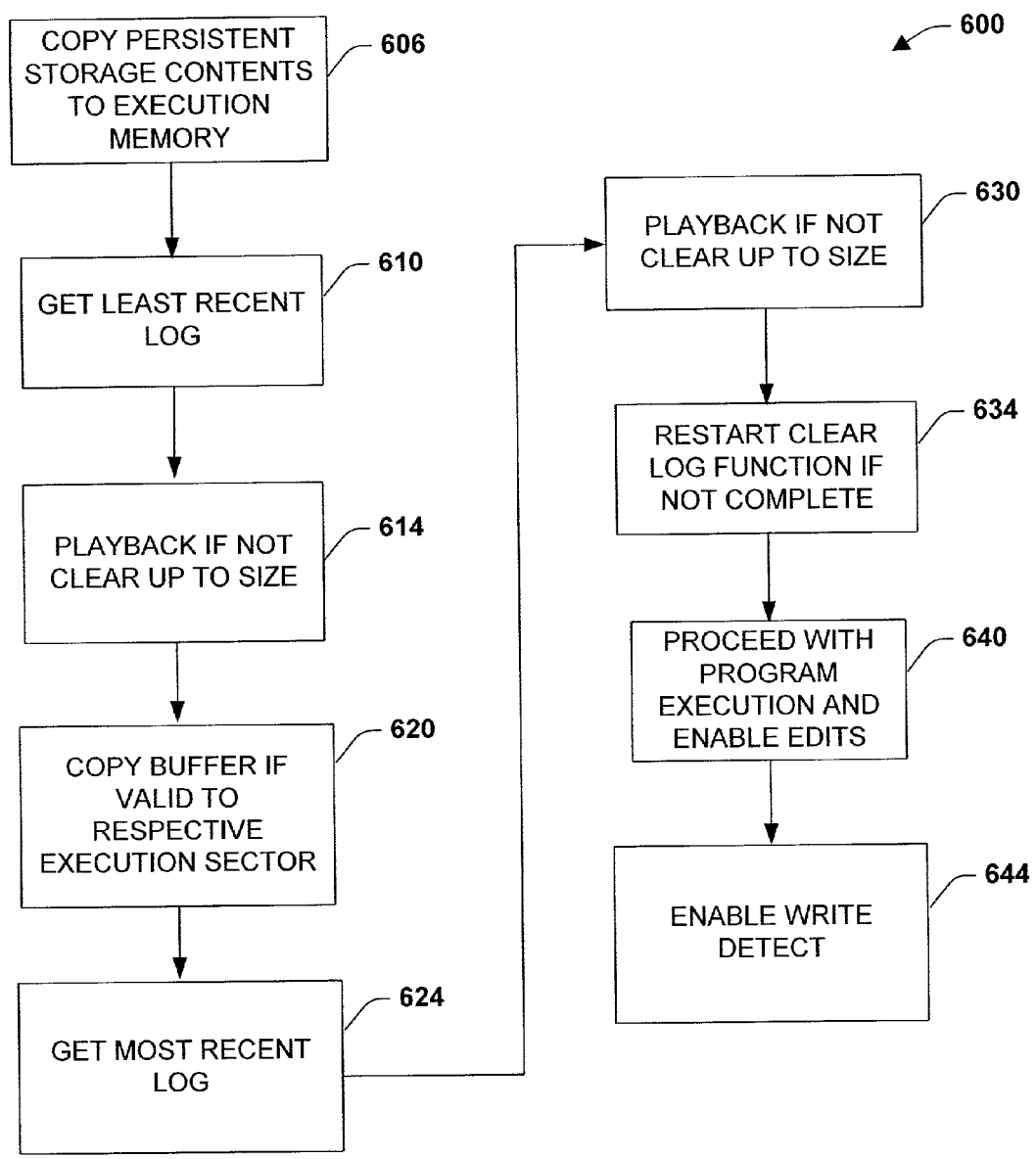
FIG. 7 is a flow diagram illustrating a more detailed methodology for a power-up routine in accordance with an aspect of the present invention.

Referring now to FIG. 7, a flow diagram 600 illustrates a more detailed power-up routine or process in accordance with an aspect of the present invention. Proceeding to 606, persistent memory storage contents containing a user program are copied to an industrial controller execution memory. At 610, a least recent log is determined by reading flags that are included in an auxiliary-powered storage memory. At 614, if the log is not clear as determined by other flags, a playback is initiated to update the execution memory with the information contained in the least recent log up to a size specified in a related status field. At 620, a persistent storage buffer area is copied, if valid, (e.g., flag indicating data is to be updated) to an associated sector in the execution memory (e.g., data block 0 of persistent memory copied to data block 0 of execution memory). At 624, a most recent log status is retrieved. At 630, a playback of the most recent log is initiated if the log is not clear up to a size specified in an associated log status field. If a clear old log status is set at 634, a clear old log function is initiated (See e.g., FIG. 9). At 640, the controller proceeds with normal program execution, wherein on-line editing is also enabled. At 644, write detection is enabled in order to detect when program edits are attempted and to enable invocation of an abort routine described below in FIG. 8.

Figure 8:
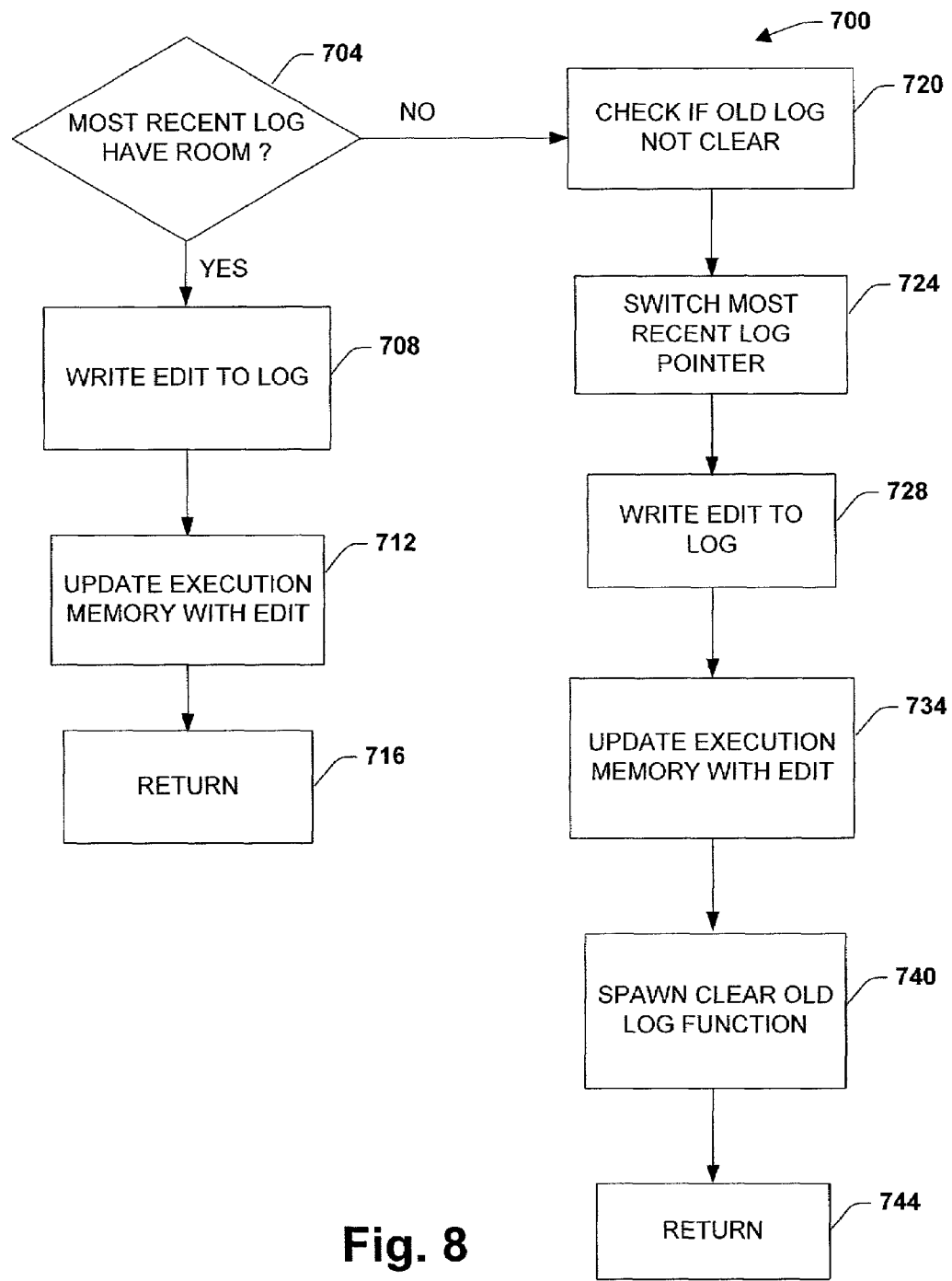
FIG. 8 is a flow diagram illustrating a methodology for an edit update and logging routine in accordance with an aspect of the present invention.

Proceeding to FIG. 8, an update edit and logging routine 700 that can be executed as part of the abort routine described above (e.g., initiated on an attempted write to execution memory) is illustrated in accordance with an aspect of the present invention. At 704, a determination is made as to whether enough storage capacity exists in a most recent log. If yes, the process proceeds to 708 and writes the attempted edit to the edit log. At 712, execution memory is updated with the edit information written to the edit log at 708. At 716, a return is initiated to complete abort routine processing and to return to industrial controller program execution.

If the most recent edit log does not have enough storage room at 704, the process proceeds to 720. At 720, a check is made to determine if an old log function or routine is not clear. If not, a wait or delay can be initiated. At 724, a switch is made as to the most recent log pointer (e.g., if Log 1 was most recent, switch to Log 0 and visa versa). At 728, the attempted edit is written to the most recent log determined at 724. At 734, execution memory is updated with the attempted edit. At 740, a clear old log function that is described in FIG. 9 is enabled for execution or "Spawned." At 744, a return is initiated to complete abort routine processing and to return to industrial controller program execution.

Figure 9:
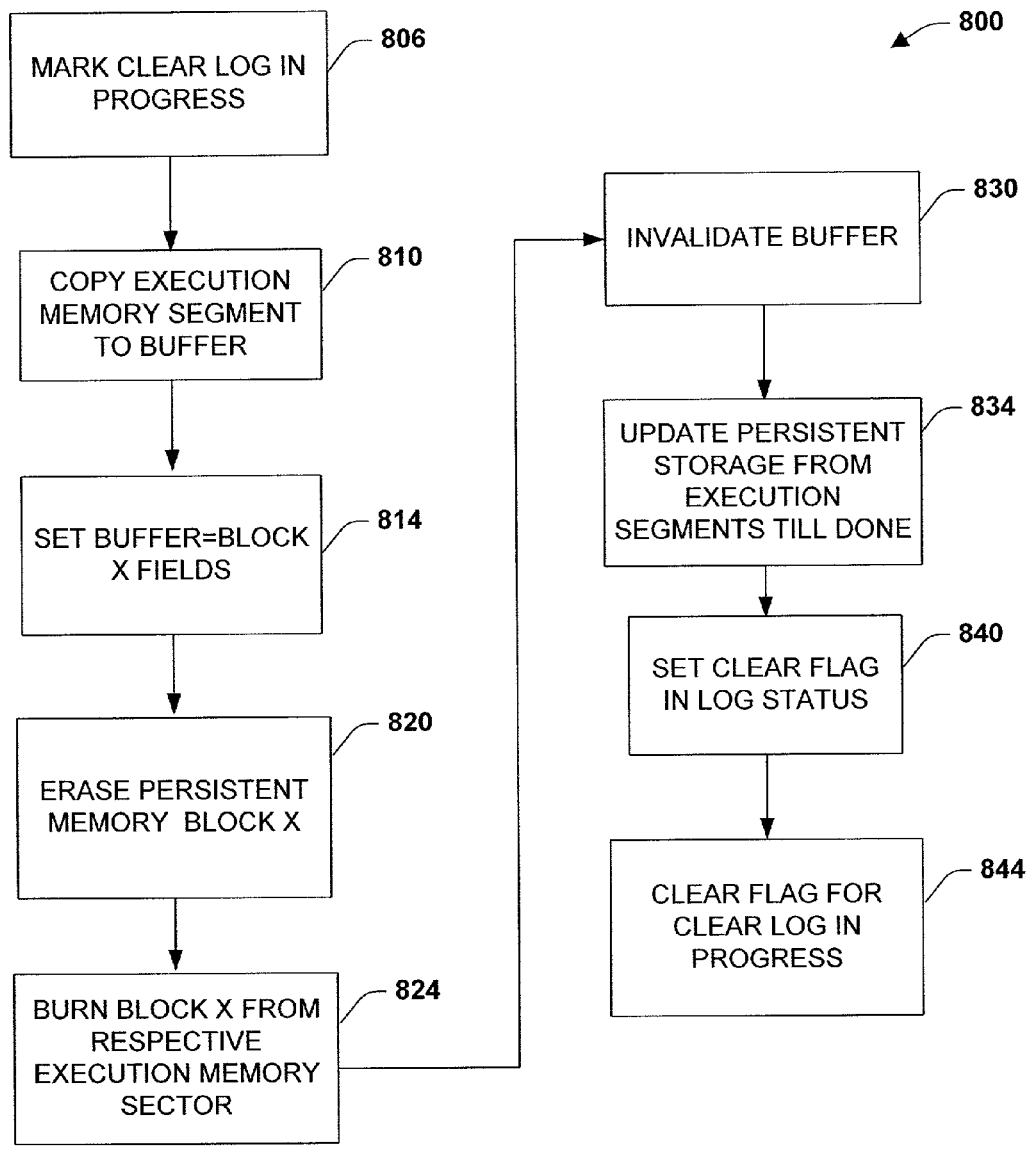
FIG. 9 is a flow diagram illustrating a methodology for a clear log routine in accordance with an aspect of the present invention.

Referring now to FIG. 9, a clear log routine 800 that can be executed as a controller background routine is illustrated in accordance with an aspect of the present invention. At 806, a clear log in progress flag is set or marked to indicate the clear log routine 800 has begun execution. At 810, the lowest segment of execution memory is copied to a buffer portion of the persistent memory. At 814, a set buffer=block X flags and/or fields are set to indicate the next block of execution memory to copy to persistent memory for update and to clear an invalidate buffer flag. At 820, the persistent memory pointed to by block X is erased. At 824, persistent memory pointed to by block X is burned from an associated or related segment of execution memory in order to update the most recent user program in the persistent storage memory. At 830, an invalidate buffer flag is set. At 834, acts 814 through 830 can be repeated until all blocks of execution memory have been copied to persistent memory to provide the most recent update. At 840, a clear flag is set to indicate the old log has been cleared. At 844, a clear old log in progress flag is cleared to indicate the completion of the clear log routine depicted at 800.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial controller, comprising:
   a first memory portion to provide persistent data storage to static portions of a user program, the first memory portion provides persistent data storage without employing an auxiliary power source to mitigate power supplied by the auxiliary power source and returns state of the user's program in the event of a power loss;
   a second memory portion employs the auxiliary power source to provide persistent data storage to dynamic portions associated with the user program, the second memory portion returns state of variables that are affected or operated upon by the user's program; and
   a volatile execution memory portion that loads an execution memory concurrently with the user program to facilitate program execution and to enable on-line edits of the user program during operation of the controller.

2. The system of claim 1, the execution memory portion is at least one of a Static Random Access Memory (SRAM) and a Static Dynamic Random Access Memory (SDRAM).

3. The system of claim 1, the first memory portion is at least one of a FLASH memory, an Electrically Erasable Programmable Read Only Memory (EEPROM), a hard drive, a floppy disk drive, and an updateable CD ROM.

4. The system of claim 1, the second memory portion is at least one of a Static Random Access Memory (SRAM) and a Static Dynamic Random Access Memory (SDRAM).

5. The system of claim 1, the auxiliary power source is at least one of a battery, a capacitor, and uninterruptible power supply (UPS).

6. The system of claim 1, further comprising a write detector to determine when changes are being attempted on the user's program.

7. The system of claim 6, the write detector is at least one of a Memory Protection Unit (MPU) and a Memory Management Unit (MMU).

8. The system of claim 1, further comprising a processor to execute the user program and to execute one or more routines to facilitate archival and retrieval of the user program in the first memory portion, the processor comprising at least one of a microprocessor, a micro-controller, an Application Specific Integrated Circuit (ASIC), a Digital Signal Processor (DSP), and a processor array.

9. The system of claim 8, the one or more routines further comprising at least one of a power-up routine, a background routine, and an abort routine to facilitate archival and retrieval of the user program.

10. The system of claim 1, the first memory portion further comprising an initial user program and an edit log that describes the most recent state of the user program.

11. The system of claim 10, the edit log further comprising at least one of a first log portion, a second log portion and a buffer to mitigate delays in programming the first memory portion.

12. The system of claim 11, the respective log portions further comprising at least one of a byte indicator, a half word indicator, a word indicator and a block indicator.

13. The system of claim 12, the respective indicators associated with at least one of an address portion, a position, a bit size, and a block size.

14. The system of claim 10, the initial user program stored in one or more segments, the segments comprising 1 to M data blocks, M being an integer.

15. The system of claim 14, the second memory portion storing 1 to N data blocks that correspond with the 1 to M data blocks of the first memory portion, N being an integer.

16. The system of claim 15, the execution memory portion is updated with contents of the 1 to M data blocks that reflects the initial user program and contents of the edit log that reflects changes to the initial user program in order to provide the most recent state of the user program in the execution memory portion.

17. The system of claim 16, the second memory portion including flags to facilitate transfer of data between the first memory portion and the execution memory portion.

18. The system of claim 17, the flags including at least one of a log status, a most recent log indication, a current buffer indication, and a clear log in progress indication.

19. A method to facilitate program storage and retrieval for an industrial controller, comprising:
   segmenting static portions of a program in a persistent memory, the static portion facilitates storage and retrieval of state of the program during power loss to the controller;
   loading an execution memory concurrently with the static portions of a program to enable on-line edits of the program during operation of the controller; and
   segmenting variable portions of the program in an auxiliary-powered memory, the variable portion facilitates storage and retrieval of state of variables that are affected or operated upon by the program, the segmentation of the static and variable portions of the program mitigates memory current requirements of the industrial controller during power loss to the controller.

20. The method of claim 19, further comprising:
   playing back a log to update the execution memory with recent changes to the program; and
   detecting a write to the execution memory to update the log with the recent changes to the program.

21. The method of claim 20, further comprising updating the persistent memory from contents of the execution memory during background operations to mitigate delays associated with the update.

22. The method of claim 20, further comprising initiating an abort routine to update the log and the execution memory, the abort routine initiated by detecting the write to the execution memory.

23. The method of claim 22, further comprising at least one of:
   determining if a recent log has adequate storage capacity;
   writing an attempted edit to the recent log; and
   updating the execution memory with the attempted edit.

24. The method of claim 22, further comprising at least one of:
   determining if an older log is clear;
   switching a pointer to a different log; and
   initiating a background operation to clear the older log.

25. A system to facilitate program storage and retrieval for an industrial controller, comprising:
   means for storing static portions of a program to be retrieved by the controller the static portion facilitates storage and retrieval of state of the program during power loss to the controller;
   means for storing variable portions of the program operable by the controller, the variable portion facilitates storage and retrieval of state of variables that are affected or operated upon by the program, the means for storing the static and variable portions of the program supplied by different storage means to mitigate memory current requirements of the industrial controller during power loss to the controller;
   means for loading execution memory concurrently with the static portions of a program;
   means for executing the static portion of the program that is retrieved by the controller; and
   means for enabling on-line edits of the program during operation of the controller.

26. An industrial controller, comprising:
   a first memory segment to provide persistent data storage to a first portion of a user program, the first memory segment provides persistent data storage without employing a battery power source to mitigate power supplied by the battery power source and returns state of the user's program in the event of a power loss;
   a second memory segment employs the battery power source to provide persistent data storage to a second portion of the user's program, the second memory portion returns state of variables that are affected or operated upon by the user's program; and
   an execution memory segment that loads an execution memory concurrently with the user program to facilitate program execution and to enable on-line edits of the user program during operation of the controller.

* * * * *